(12) United States Patent
Ishino

(10) Patent No.: US 7,642,311 B2
(45) Date of Patent: Jan. 5, 2010

(54) METHOD FOR PRODUCING A NATURAL RUBBER MASTER BATCH AND A SYNTHETIC ISOPRENE RUBBER BATCH USING BIODEGRADED RUBBER POWDER, USING RUBBER POWDER AND A FILLING AGENT, OR USING BIODEGRADED RUBBER POWDER AND A FILLING AGENT

(75) Inventor: Yuichi Ishino, Musashimurayama (JP)

(73) Assignee: Bridgestone Corporation, Tokyo (JP)

( * ) Notice: Subject to any disclaimer, the term of this patent is extended or adjusted under 35 U.S.C. 154(b) by 251 days.

(21) Appl. No.: 11/655,089

(22) Filed: Jan. 19, 2007

(65) Prior Publication Data

US 2007/0173567 A1   Jul. 26, 2007

(30) Foreign Application Priority Data

| Jan. 20, 2006 | (JP) | ............................. 2006-012548 |
| Mar. 28, 2006 | (JP) | ............................. 2006-088070 |
| Jan. 18, 2007 | (JP) | ............................. 2007-009113 |
| Jan. 18, 2007 | (JP) | ............................. 2007-009200 |

(51) Int. Cl.
  *C08J 3/02* (2006.01)
  *C08J 3/20* (2006.01)
(52) U.S. Cl. ...................... 524/501; 523/351
(58) Field of Classification Search ................. 524/501; 523/351
  See application file for complete search history.

(56) References Cited

U.S. PATENT DOCUMENTS 7,344,777 B2 *   3/2008   Kino et al. .................. 428/402

FOREIGN PATENT DOCUMENTS

| EP | 1 454 942 A1 | 9/2004 |
| GB | 1125801 A | 9/1968 |
| JP | 11-60793 A | 3/1999 |
| WO | WO 02/38667 A | 5/2002 |

* cited by examiner

*Primary Examiner*—Ling-Siu Choi
*Assistant Examiner*—Hui Chin
(74) *Attorney, Agent, or Firm*—Sughrue Mion, PLLC

(57) ABSTRACT

The present invention makes it possible (1) to produce a natural rubber wet master batch and/or a synthetic isoprene rubber wet master batch by mixing a slurry solution of biodegraded rubber powder dispersed in water with a natural rubber latex solution and/or a synthetic isoprene rubber latex solution. Further, the present invention makes it possible (2) to produce a natural rubber wet master batch and/or a synthetic isoprene rubber wet master rubber powder with a natural rubber latex solution and/or a synthetic isoprene batch by mixing a slurry solution of dispersed carbon black and/or silica and rubber latex solution. A rubber composition having high physical properties can be obtained by adding a natural rubber master batch and/or a synthetic isoprene rubber master batch obtained by drying the natural rubber wet master batch and/or the synthetic isoprene rubber wet master batch. Further, the rubber composition containing the wet master batch obtained by the method in combination of above (1) and (2) also exhibits high physical properties.

21 Claims, No Drawings

METHOD FOR PRODUCING A NATURAL RUBBER MASTER BATCH AND A SYNTHETIC ISOPRENE RUBBER BATCH USING BIODEGRADED RUBBER POWDER, USING RUBBER POWDER AND A FILLING AGENT, OR USING BIODEGRADED RUBBER POWDER AND A FILLING AGENT

BACKGROUND OF THE INVENTION

The present invention relates to (1) a method for producing a natural rubber master batch and a synthetic isoprene rubber master batch using biodegraded rubber powder and to a rubber composition containing the rubber master batch. The present invention further relates to (2) a method for producing a natural rubber master batch and a synthetic isoprene rubber master batch using rubber powder and a filling agent and to a rubber composition containing the rubber master batch. Further, the present invention relates to a method as a combination of the above methods (1) and (2), which is a method for producing a natural rubber master batch and a synthetic isoprene rubber master batch using biodegraded rubber powder and a filling agent and to a rubber composition containing the rubber master batch.

The rate of collection of waste tires is fairly high as compared to that of common plastic articles, and the collected waste tires are recycled as fuel, particularly in cement plants. However, with increasing awareness of environmental issues, improvement of so-called rate of material recycling is required, that is, recycling of rubber pieces and rubber crumbs produced by chopping off or crushing waste tires. As methods for crushing waste tire, in addition to the roller crush method in which waste tires are crushed mechanically at an ambient temperature, there are the freeze crush method, in which waste tires are frozen by means of e.g. liquid nitrogen and then crushed, and the water hammer crush method with the use of ultra-high pressured water. As described, there are attempts to produce fine particles at low cost.

For the purpose of kneading rubber powder into unvulcanized rubber to produce a vulcanized rubber product, the process of vulcanizing and adhering rubber powder with fresh unvulcanized rubber is important. For example, recycled rubbers have been used since a long time ago, which are produced by mixing a recycling agent and oil with rubber powder, devulcanizing the rubber mixture with heat, and forming it into a sheet-like shape rubber using a roller. Various methods for devulcanizing the surface of rubber powder have been proposed, among which is the crush devulcanization method in which a large shear stress is applied to the rubber powder using e.g. a biaxial extruder. However, there is a disadvantage in these methods of higher energy cost, since a high processing temperature or a high shear stress is required.

Nonpatent Reference 1: Japanese Patent Application Laid-Open H11-236464

SUMMARY OF THE INVENTION

Therefore, the present invention is intended to provide a method for processing rubber pieces or rubber powder at low energy cost and further to provide a method for utilizing the processed product for promotion of recycle.

The inventors have made intensive investigations for the purpose of solving the above problem, and they have finally succeeded in producing a natural rubber wet master batch and/or a synthetic isoprene rubber wet master batch by mixing a slurry of biodegraded rubber powder dispersed into water with natural rubber latex and/or synthetic isoprene rubber latex. Further, the inventors have found that a rubber composition containing a natural rubber master batch and/or a synthetic isoprene rubber master batch obtained by drying the above natural rubber master batch and/or the synthetic isoprene rubber master batch exhibited high physical properties, thereby the present invention is completed.

A natural rubber wet master batch and/or a synthetic isoprene rubber wet master batch have also been obtained by mixing a slurry, in which rubber powder crushed by the conventional method, carbon black and/or silica have been dispersed in water in advance, with natural rubber latex and/or synthetic isoprene rubber latex. Further, the inventors have found that a rubber composition containing a natural rubber master batch and/or a synthetic isoprene rubber master batch obtained by drying the above natural rubber wet master batch and/or synthetic isoprene rubber wet master batch exhibited high rubber physical properties, for example in breaking strength and elongation after fracture, thereby the present invention is completed.

The present invention includes (1) to (21) described below.

(1) A method for producing a natural rubber master batch and/or a synthetic isoprene rubber master batch, comprising the step of mixing a slurry solution of biodegraded rubber powder previously dispersed into water with a natural rubber latex solution and/or a synthetic isoprene rubber latex solution.

(2) The method according to above (1), wherein said biodegraded powder is that produced by biodegradation of polyisoprene-type rubber using BS-HA strain (FERM BP-10750), which is an actinomyces belonging to the genus of *Nocardia*.

(3) The method according to above (2), wherein the content of said polyisoprene rubber contained in the rubber powder is no less than 10 weight %.

(4) The method according to above (2), wherein the average particle diameter of said rubber powder is no more than 200 micrometers.

(5) The method according to above (1), wherein the slurry concentration of said rubber powder in said slurry solution is in the range of 0.5 to 60 weight % with respect to the slurry solution.

(6) The method according to above (1), wherein the concentration of said rubber powder in the mixed solution of said slurry solution and said natural rubber latex solution and/or said synthetic isoprene rubber latex solution is in the range of 0.1 to 100 weight parts with respect to 100 weight parts of rubber component resulted from said natural rubber latex and/or said synthetic isoprene rubber latex.

(7) A natural rubber master batch and/or a synthetic isoprene rubber wet master batch produced by the method according to any one of above (1) to (6).

(8) A natural rubber master batch and/or a synthetic isoprene rubber master batch produced by coagulating and further drying the natural rubber wet master batch and/or the synthetic isoprene rubber wet master batch according to above (7).

(9) A rubber composition containing the natural rubber master batch and/or the synthetic isoprene rubber master batch according to above (8).

(10) The rubber composition according to above (9), wherein the amount of rubber powder contained in said natural rubber master batch and/or the synthetic isoprene rubber master batch is in the range of 0.1 to 50 weight parts with respect to 100 weight parts of rubber component which is different from the rubber powder in said rubber composition.

(11) A method for producing a natural rubber wet master batch and/or a synthetic isoprene rubber wet master batch, comprising the step of mixing a slurry solution of carbon black and/or silica and powder rubber previously dispersed in water, with a natural rubber latex solution and/or a synthetic isoprene rubber latex solution.

(12) The method according to above (11), wherein said rubber powder is biodegraded rubber powder.

(13) The method according to above (11), wherein the average particle diameter of said rubber powder is no more than 200 micrometers.

(14) The method according to above (11), wherein a surfactant is added to said slurry solution and/or said natural rubber latex solution and/or said synthetic isoprene rubber latex solution.

(15) The method according to above (11), wherein the slurry concentration of said rubber powder in said slurry solution is in the range of 0.5 to 60 weight % with respect to the slurry solution.

(16) The method according to above (11), wherein the amount of said carbon black and/or silica contained in said natural rubber wet master batch and/or said synthetic isoprene rubber wet master batch is in the range of 5 to 100 weight parts with respect to 100 weight parts of rubber component resulted from said natural rubber latex and/or said synthetic isoprene rubber latex.

(17) The method according to above (11), wherein the amount of said rubber powder contained in the natural rubber wet master batch and/or the synthetic isoprene rubber wet master batch is in the range of 0.1 to 100 weight parts with respect to 100 weight parts of rubber component resulted from said natural rubber latex and/or said synthetic isoprene rubber latex.

(18) A natural rubber wet master batch and/or a synthetic isoprene rubber wet master batch produced by the method according to any one of above (11) to (17).

(19) A natural rubber master batch and/or a synthetic isoprene rubber master batch produced by coagulating and further drying the natural rubber wet master batch and/or the synthetic isoprene rubber wet master batch according to above (18).

(20) A rubber composition containing the natural rubber master batch and/or synthetic isoprene rubber master batch according to above (19).

(21) The rubber composition according to above (20), wherein the amount of rubber powder contained in said natural rubber master batch and/or said synthetic isoprene rubber master batch is in the range of 0.01 to 50 weight parts with respect to 100 weight parts of rubber component which is different from the rubber powder in said rubber composition.

The present invention makes it possible to produce a natural rubber wet master batch and/or a synthetic isoprene rubber wet master batch, by mixing a slurry solution of biodegraded rubber powder dispersed into water with a natural rubber latex solution and/or a synthetic isoprene rubber latex solution. Further, the present invention makes it possible to produce a natural rubber wet master batch and/or a synthetic isoprene rubber wet master batch by mixing a slurry solution of carbon black and/or silica and rubber powder previously dispersed into water, with a natural rubber latex and/or a synthetic isoprene rubber latex solution. A rubber composition having high physical properties can be obtained by mixing a natural rubber master batch and/or a synthetic isoprene rubber master batch obtained by drying the above natural rubber wet master batch and/or synthetic isoprene rubber wet master batch.

BEST MODE FOR CARRYING OUT THE INVENTION

Preferred embodiments of the invention will be described below in detail.

According to a first aspect, the present invention relates to a method for producing a natural rubber wet master batch and/or a synthetic isoprene rubber wet master batch, comprising the step of mixing a slurry solution of biodegraded rubber powder previously dispersed into water with a natural rubber latex solution and/or a synthetic isoprene rubber latex solution. In an ordinary method, a carbon wet master batch is produced by mixing a slurry, which is produced by previously mixing a filling agent such as carbon black or silica with water at a certain rate and dispersing the filling agent into water with a mechanical force, with natural rubber latex and/or synthetic isoprene rubber latex, succeeded by coagulating the mixture by adding a coagulating agent such as acid and collecting and drying the obtained coagulation. In the present invention, on the other hand, a rubber powder wet master batch is prepared in advance by mixing a slurry, which is produced by mixing biodegraded rubber powder with water at a certain rate and dispersing the rubber powder into water, with natural rubber latex and/or synthetic isoprene rubber latex.

Since the surface of biodegraded rubber powder is covered with sugar or protein to make it to be hydrophilic, the biodegraded rubber powder can be dispersed in water easily. In a preferred embodiment of the present invention, the rubber powder may be biodegraded using a BS-HA1 strain, an actinomyces belonging to the genus of *Nocardia*, however, present invention is not limited thereto. While it is known that an actinomyces of the genus of *Nocardia* degrades polyisoprene-type rubbers including natural rubber, it is impossible to degrade a hard rubber containing e.g. carbon black by using a microorganism of *Nocardia* of normal kind.

However, after intensive screening on microorganisms that degrade natural rubber from soils of many kinds, the inventors have found the BS-HA1 strain, which belongs to the genus of *Nocardia*. Since the BS-HA1 strain can degrade polyisoprene-type rubbers containing carbon black, it is suitable for degradation of rubber powder used in rubber products such as tires. The BS-HA1 strain was deposited to the International Patent Organism Depositary in the National Institute of Advanced Industrial Science and Technology at Jun. 2, 2003, as FERM P-19378, which was converted to International deposition at Dec. 11, 2006, as FERM BP-10750.

The BS-HA1 strain used in the present invention proliferates in a liquid medium of inorganic salt, with degrading the rubber powder. As inorganic salts contained in the liquid medium, those containing nitrogen, phosphorus, calcium or magnesium can be listed. The rubber powder biodegraded in such a way has a hydrophilic surface, as described above. Since the BS-HA1 strain is an actinomyces that degrades polyisoprene-type rubbers, the larger content of polyisoprene-type rubber contained in the rubber powder is preferable. The content of polyisoprene rubbers in the rubber powder may preferably be no less than 10 weight %, and more preferably no less than 50 weight %.

In the present invention, the average particle diameter of the rubber powder may preferably be no more than 200 micrometers, for the purpose of obtaining a stable slurry. This is because production of an uniform slurry is difficult, when the particle diameter of the rubber powder is large.

In order to obtain a more stable slurry solution, a certain amount of water may be added to biodegraded rubber, and then the mixture is stirred at a high speed for a certain period using a blending machine such as a colloid mill. In the present invention, an anionic surfactant, a cationic surfactant, a nonionic surfactant or an ampholytic surfactant may be added to the above slurry, if needed. The anionic surfactant and the nonionic surfactant are especially preferred. The concentration of the rubber powder in the slurry may preferably be in the range of 0.5 to 60 weight % with respect to the slurry, and more preferably in the range of 1 to 30 weight %.

A wet master batch may be produced by mixing the slurry solution and natural rubber latex and/or synthetic isoprene rubber latex. The quantity of rubber powder to be added for the production of the mixture of the slurry solution and the latex solution may preferably be in the range of 0.1 to 100 weight parts with respect to 100 weight parts of rubber component resulted from the above latex, and more preferably it may be in the range of 1 to 10 weight parts. This is because the recycle rate may decrease when the amount of added rubber powder becomes smaller while the physical properties may be deteriorated with too much amount of rubber powder.

Then the wet master batch is coagulated. The methods for coagulating which may be adopted include those using acids as coagulating agents, such as formic acid or sulfuric acid or a salt such as sodium chloride, for example, in the same way as in ordinary cases. Inorganic filling agents such as carbon black and silica or additive agents such as a vulcanizing agent, an antioxidant, a coloring agent and a dispersing agent may be added to the wet master batch as need.

A process of drying-out is usually carried out in the final stage of manufacturing a master batch. Although common dryers including a vacuum dryer, an air dryer, a drum dryer and a hand dryer may be used in the present invention, a mechanical shear stress may preferably be applied during drying-out in order to improve the dispersibility of the rubber powder. Although this may be conducted using a common kneading machine, a continuous kneading machine may be more preferably used in view of industrial productivity. Further, a biaxial kneading extruder having the same direction of rotation or that having the opposite direction of rotation may be more preferably used.

The amount of water contained in the wet master batch before the drying process may preferably be no less than 10% in the above process of drying-out with shear stress. If the amount of water is below 10%, the improvement of dispersibility of the filling agent in the drying process will be reduced.

A rubber composition as a final product may be obtained by adding the above master batch. Rubber sources of different kinds may be also added to the rubber composition. The content of rubber powder contained in the master batch to be added to the rubber composition may preferably be in a range of 0.1 to 50 weight parts with respect to 100 weight parts of rubber component, which is different from the rubber powder in the rubber composition obtained as a final product.

Inorganic filling agents such as carbon black and silica, a vulcanizing agent, a vulcanization accelerator, an antioxidant, an antiscorching agent, zinc flower or stearic acid may be added to the rubber composition, so long as the agents do not impair the purpose of the present invention.

According to a second aspect, the present invention relates to a method for producing a natural rubber wet master batch and/or a synthetic isoprene rubber wet master batch, comprising the step of mixing a slurry solution of carbon black and/or silica and powder rubber previously dispersed in water, with a natural rubber latex solution and/or a synthetic isoprene rubber latex solution. In an ordinary method, a carbon wet master batch may be produced by previously mixing a filling agent such as carbon black and silica with water at a certain rate and dispersing the filling agent in water with a mechanical force to produce a slurry, mixing the slurry of the filling agent with the above latex, then coagulating with a coagulating agent such as an acid, succeeded by collecting the obtained coagulation and further drying it. In the present invention, on the other hand, a rubber powder carbon wet master batch may be previously prepared by mixing a filling agent such as carbon black and/or silica with rubber powder at a certain rate in water, dispersing the filling agent in water with a mechanical force to produce a slurry, and then mixing the slurry of the filling agent with the above latex.

In the present invention, the average particle diameter of the rubber powder may preferably be no more than 200 micrometers, for the purpose of obtaining a stable slurry. This is because production of an uniform slurry is difficult, when the particle diameter of the rubber powder is large and difference in the particle diameter between rubber powder and that of carbon black is large.

In order to obtain a more stable slurry, certain amounts of the above rubber powder, the filling agent and a surfactant may be added to water and the mixture may be stirred at a high speed for a certain period using a mixer such as a high shear mixer, a high pressure homogenizer, an ultrasonic homogenizer, a colloid mill or an impeller mill. In the present invention, an anionic surfactant, a cationic surfactant, a nonionic surfactant or an ampholytic surfactant may be used, the anionic surfactant and the nonionic surfactant are especially preferable. In general, the amount of the added surfactant is 0.01 to 2 weight % with respect to the natural rubber latex and/or the synthetic isoprene rubber latex.

The carbon black to be used in the present invention is not particularly limited, and those used in the common rubber industry may be used. Carbon blacks of various grades including SAF, HAF, ISAF, FEF and GPF may be used separately or in a mixed way. The silica to be used in the present invention may preferably be a wet silica, a dry silica or a colloidal silica, though not to be limited thereto.

The concentration of the above slurry of carbon black and/or silica and rubber powder dispersed in water may preferably be in the range of 0.5 to 60 weight %, and more preferably in the range of 1 to 30 weight %. Further, the amount of carbon black and/or silica to be added may preferably be in the range of 5 to 100 weight parts with respect to 100 weight parts of rubber component in the wet master batch resulted from the natural rubber latex and/or the synthetic isoprene rubber latex, and more preferably in a range of 10 to 70 weight parts. If the amount of the filling agent is smaller than 5 weight parts, the reinforcement effect will not be enough, while workability would deteriorate if the amount becomes larger than 100 weight parts.

The amount of rubber powder to be added may preferably be in the range of 0.1 to 100 weight parts with respect to 100 weight parts of rubber component resulted from the latex in the above wet master batch. This is because with the amount of added rubber powder become smaller, the recycle rate will decrease, while physical properties will deteriorate with too much rubber powder.

The above wet master batch can be coagulated using an acid such as formic acid and sulfuric acid or a salt such as sodium chloride as a coagulating agent, in the same way as in common cases. Further, in the present invention, coagulation may be achieved by mixing the latex with the above slurry, without adding a coagulating agent. Besides carbon black and silica, other additive agents including an inorganic filling agent, a vulcanizing agent, an antioxidant, a coloring agent and a dispersing agent may be added to the wet master batch as need.

A process of drying-out is usually carried out in the final stage of manufacturing a master batch. Although common dryers including a vacuum dryer, an air dryer, a drum dryer and a hand dryer may be used in the present invention, a mechanical shear force may be preferably applied during drying-out in order to improve the dispersibility of the filling agent and the rubber powder. Although this process may be conducted using a common kneading machine, a continuous kneading machine may be preferably used from the viewpoint of industrial productivity. Further, a biaxial kneading extruder having the same direction of rotation or that having the opposite direction of rotation may be more preferably used.

The amount of water contained in the wet master batch before the drying process may preferably be no less than 10% in the above process of drying-out with shear stress. If the amount of water is below 10%, the improvement of dispersibility of the filling agent in the drying process will be reduced.

Further, the aforementioned biodegraded rubber powder may also be used as rubber powder used in the rubber powder carbon wet master batch. Since the biodegraded rubber powder has a hydrophilic surface as described above, a more stable slurry can be made by dispersing carbon black and/or silica and the rubber powder in water. The dispersibility of the rubber powder is also excellent.

A final rubber composition may be produced by adding the master batch, however, rubber components of different kinds may also be added to the rubber composition. The content of rubber powder contained in the master batch to be added to the rubber composition may preferably be in a range of 0.01 to 50 weight parts with respect to 100 weight parts of rubber component, which is different from the rubber powder in the rubber compound obtained as a final product.

Further, a vulcanizing agent, a vulcanization accelerator, an antioxidant, an antiscorching agent, zinc flower or stearic acid may be added to the rubber compound, so long as the agents do not impair the purpose of the present invention.

Then the physical properties of the rubber composition containing the master batch obtained in the method of the present invention is evaluated, and it was revealed that the rubber composition has an excellent physical property as a rubber, for example in the terms of disruptive strength and breaking elongation, which will be described below in preferred embodiments.

EXAMPLES

Next, the present invention will be explained based on the examples and the comparative example. Though the present invention is not limited by the examples described below.

Example 1

(1) Preparation of a Latex Solution

Natural rubber field latex (DRC: 26.2%, pH: 10.5) was diluted with water to make the rubber content to be 20%.

(2) Biodegradation of Rubber Powder

A culture medium having a composition shown in Table 1 was prepared in a glass vessel having a silicon stopcock, rubber powder of 10 g/l having an average particle diameter of 100 μm was added thereto, and it was subjected to a sterilization process in an autoclave at 90° C. Culture medium of BS-HA1 strain precultured with a rubber glove as the sole carbon source was added thereto, and, it was subjected to a sterilization process at 121° C. after a rotary culture with a magnetic stirrer for twenty days. The rubber powder was filtered with a paper filter. The rubber powder on the paper filter was rinsed with acetone several times and then rinsed with purified water. After confirming the rubber powder was well dried, the obtained rubber powder was used as a sample of biodegraded rubber powder to be added.

TABLE 1

| | |
|---|---|
| $K_2HPO_4$ | 8.0 g |
| $K_2HPO_4$ | 1.0 g |
| $MgSO_4 \cdot 7H_2O$ | 0.2 g |
| NaCl | 0.1 g |
| $(NH_4)SO_4$ | 0.5 g |
| $Ca(NO_3)_2$ | 0.1 g |
| Metal solution | 10 ml |
| Vitamin solution | 1 ml |
| Deionized water | 1000 ml |
| PH | 7.5 |

(3) Preparation of a Slurry Solution

A certain amount of the above biodegraded rubber powder was added to water and it was stirred at high speed for a certain period using a colloid mill. The slurry concentration of the rubber powder was 10 weight % with respect to the slurry.

(4) Coagulation Process

The latex and the slurry having been prepared in the above manner were added into a homo-mixer to make the amount of rubber powder to be 10 weight parts with respect to 100 weight parts of rubber component. Formic acid was added thereto while stirring until pH reached to 4.7, to produce a wet master batch. The coagulated wet master batch was collected and rinsed with water and then dehydrated.

(5) Drying Process

The above coagulated sample was dried out using an air dryer to obtain a master batch.

(6) Rubber Composition 50 weight parts HAF, 8 weight parts zinc oxide, 1.2 weight parts sulfur, 2 weight parts stearic acid, 1 weight part NS and 1 weight part 6C were kneaded into the above master batch (containing 100 weight parts rubber and 10 weight parts rubber powder) to obtain a rubber composition.

Example 2

A rubber composition of the second example containing master batch was obtained in the following way.

(1) Preparation of a Latex Solution

Natural rubber field latex (DRC: 26.2%, pH: 10.5) was diluted with water to make the rubber content to be 20%.

(2) Preparation of a Slurry

A certain amount of rubber powder having an average particle diameter 100 μm and carbon black HAF were added to water and stirred at high speed for a certain period using a colloid mill. The slurry concentrations of carbon black and rubber powder were 10 weight % for carbon black and 2 weight % for rubber powder respectively.

(3) Coagulation Process

The latex and the slurry having been prepared in the above manner were added in a homo-mixer to make the amounts of carbon black and rubber powder to be 60 weight parts with respect to 100 weight parts of rubber component. Formic acid was added thereto while stirring until pH reached to 4.7, to obtain a wet master batch. The coagulated wet master batch was collected and rinsed with water and then dehydrated.

(4) Drying Process

The above coagulated sample was dried out using an air dryer to obtain a master batch.

(5) Rubber Composition 3 weight parts zinc oxide, 1.2 weight parts sulfur, 2 weight parts stearic acid, 1 weight part NS and 1 weight part 6C were kneaded into the above master batch (containing 100 weight parts rubber, 50 weight parts carbon black and 10 weight parts rubber powder) to obtain a rubber composition.

Example 3

A rubber composition was obtained in the same manner as in Example 2, while biodegraded rubber powder described in Example 1 was used as the rubber powder.

Comparative Example

A rubber compound of a comparative example was obtained in the follows way.

(1) Preparation of a Latex Solution

Natural rubber field latex (DRC: 26.2%, pH: 10.5) was diluted with water to make the rubber content to be 20%.

(2) Coagulation Process

Formic acid was added to the latex prepared in the above manner while stirring until pH reached to 4.7. The coagulated natural rubber was collected and rinsed with water and then dehydrated.

(3) Drying Process

The above coagulated natural rubber was dried out using an air dryer.

(4) Rubber Composition 50 weight parts carbon black, 10 weight parts rubber powder, 8 weight parts zinc oxide, 1.2 weight parts sulfur, 2 weight parts stearic acid, 1 weight part NS and 1 weight part 6C were kneaded into 100 weight parts of the above natural rubber to obtain a rubber composition.

The physical properties of the rubber composition containing the master batch according to the present invention and those of the rubber composition of the comparative example not containing the master batch were evaluated using the indexes of disruptive strength and result of the elongation fatigue test. The disruptive strength was measured pursuant to Japanese Industrial Standards K6251-1993. The elongation fatigue test was carried out by repeatedly elongating a test piece in the shape of a dumbbell at a velocity of 300 rpm and distortion of 100%, and evaluating the logarithm of the number of times needed for disruption. The results are shown in Table 2. As shown in Table 2, the rubber according to any one of Examples 1 to 3 exhibited higher physical properties than those of the comparative example, in both the disruptive strength and in the results of the elongation fatigue test.

TABLE 2

|  | Example 1 | Example 2 | Example 3 | Comparative Example |
|---|---|---|---|---|
| Disruptive strength | 104 | 102 | 106 | 100 |
| Fatigue life | 104 | 103 | 109 | 100 |

Each value is shown as an index obtained by converting the value in Comparative Example to be 100

INDUSTRIAL APPLICABILITY

The present invention makes it possible (1) to produce a natural rubber wet master batch and/or a synthetic isoprene rubber wet master batch by mixing a slurry solution of biodegraded rubber powder dispersed in water with natural rubber latex and/or synthetic isoprene rubber latex. A rubber composition having high physical properties can be obtained by adding a natural rubber master batch and/or a synthetic isoprene rubber master batch obtained by drying out the above-mentioned wet master batch. Further, the present invention makes it possible (2) to produce a natural rubber wet master batch and/or a synthetic isoprene rubber master batch by mixing a slurry solution of dispersed carbon black and/or silica and rubber powder with natural rubber latex and/or synthetic isoprene rubber latex. A rubber composition having high physical properties, for example disruptive strength and fatigue life, can be obtained by adding a natural rubber master batch and/or a synthetic rubber master batch obtained by drying out the above wet master batch. Further, the present invention makes it possible to produce a rubber composition by adding a natural rubber master batch and/or a synthetic isoprene rubber master batch obtained using a combination of the above methods (1) and (2), by drying a wet master batch obtained by mixing a slurry solution of dispersed biodegraded rubber powder and carbon black and/or silica with the latex. The obtained rubber composition also exhibits high physical properties. The method of processing rubber of the present invention has an advantage of low energy cost, and the natural rubber master batch and/or the synthetic isoprene rubber master batch are useful for the purpose of recycling of rubber.

The invention claimed is:

1. A method for producing a natural rubber wet master batch and/or a synthetic isoprene rubber wet master batch, comprising the step of mixing a slurry solution of biodegraded rubber powder previously dispersed into water with a natural rubber latex solution and/or a synthetic isoprene rubber latex solution.

2. The method according to claim 1, wherein said biodegraded powder is that produced by biodegradation of polyisoprene-type rubber using BS-HA strain (FERM BP-10750), which is an actinomyces belonging to the genus of *Nocardia*.

3. The method according to claim 2, wherein the content of said polyisoprene-type rubber contained in the rubber powder is no less than 10 weight %.

4. The method according to claim 2, wherein the average particle diameter of said rubber powder is no more than 200 micrometers.

5. The method according to claim 1, wherein the slurry concentration of said rubber powder in said slurry solution is in the range of 0.5 to 60 weight % with respect to the slurry solution.

6. The method according to claim 1, wherein the concentration of said rubber powder in the mixed solution of said slurry solution and said natural rubber latex solution and/or said synthetic isoprene rubber latex solution is in the range of 0.1 to 100 weight parts with respect to 100 weight parts of rubber component resulted from said natural rubber latex and/or said synthetic isoprene rubber latex.

7. A natural rubber wet master batch and/or a synthetic isoprene rubber wet master batch produced by the method according to any one of claims 1 to 6.

8. A natural rubber master batch and/or a synthetic isoprene rubber master batch produced by coagulating and further drying the natural rubber wet master batch and/or the synthetic isoprene rubber wet master batch according to claim 7.

9. A rubber composition containing the natural rubber master batch and/or the synthetic isoprene rubber master batch according to claim 8.

10. The rubber composition according to claim 9, wherein the amount of rubber powder contained in said natural rubber master batch and/or the synthetic isoprene rubber master batch is in the range of 0.1 to 50 weight parts with respect to 100 weight parts of rubber which is different from the rubber powder in said rubber composition.

11. A method for producing a natural rubber wet master batch and/or a synthetic isoprene rubber wet master batch, comprising the step of mixing a slurry solution of carbon black and/or silica and powder rubber previously dispersed in water with a natural rubber latex solution and/or a synthetic isoprene rubber latex solution.

12. The method according to claim 11, wherein said rubber powder is biodegraded rubber powder.

13. The method according to claim 11, wherein the average particle diameter of said rubber powder is no less than 200 micrometers.

14. The method according to claim 11, wherein a surfactant is added to said slurry solution and/or said natural rubber latex solution and/or said synthetic isoprene rubber latex solution.

15. The method according to claim 11, wherein the slurry concentration of said rubber powder in said slurry solution is in the range of 0.5 to 60 weight % with respect to the slurry solution.

16. The method according to claim 11, wherein the amount of said carbon black and/or silica contained in said natural rubber wet master batch and/or said synthetic isoprene rubber wet master batch is in the range of 5 to 100 weight parts with respect to 100 weight parts of rubber component resulted from said natural rubber latex and/or said synthetic isoprene rubber latex.

17. The method according to claim 11, wherein the amount of said rubber powder contained in the natural rubber wet master batch and/or the synthetic isoprene rubber wet master batch is in the range of 0.1 to 100 weight parts with respect to 100 weight parts of rubber component resulted from said natural rubber latex and/or said synthetic isoprene rubber latex.

18. A natural rubber wet master batch and/or a synthetic isoprene rubber wet master batch produced by the method according to any one of claims 11 to 17.

19. A natural rubber master batch and/or a synthetic isoprene rubber master batch produced by coagulating and further drying the natural rubber wet master batch and/or the synthetic isoprene rubber wet master batch according to claim 18.

20. A rubber composition containing the natural rubber master batch and/or synthetic isoprene rubber master batch according to claim 19.

21. The rubber composition according to claim 20, wherein the amount of rubber powder contained in said natural rubber master batch and/or said synthetic isoprene rubber master batch is in the range of 0.01 to 50 weight parts with respect to 100 weight parts of rubber component which is different from the rubber powder in said rubber composition.

\* \* \* \* \*